(No Model.) 2 Sheets—Sheet 1.
L. K. JEWETT.
ANTIFRICTION SIDE BEARING FOR CARS.
No. 511,955. Patented Jan. 2, 1894.
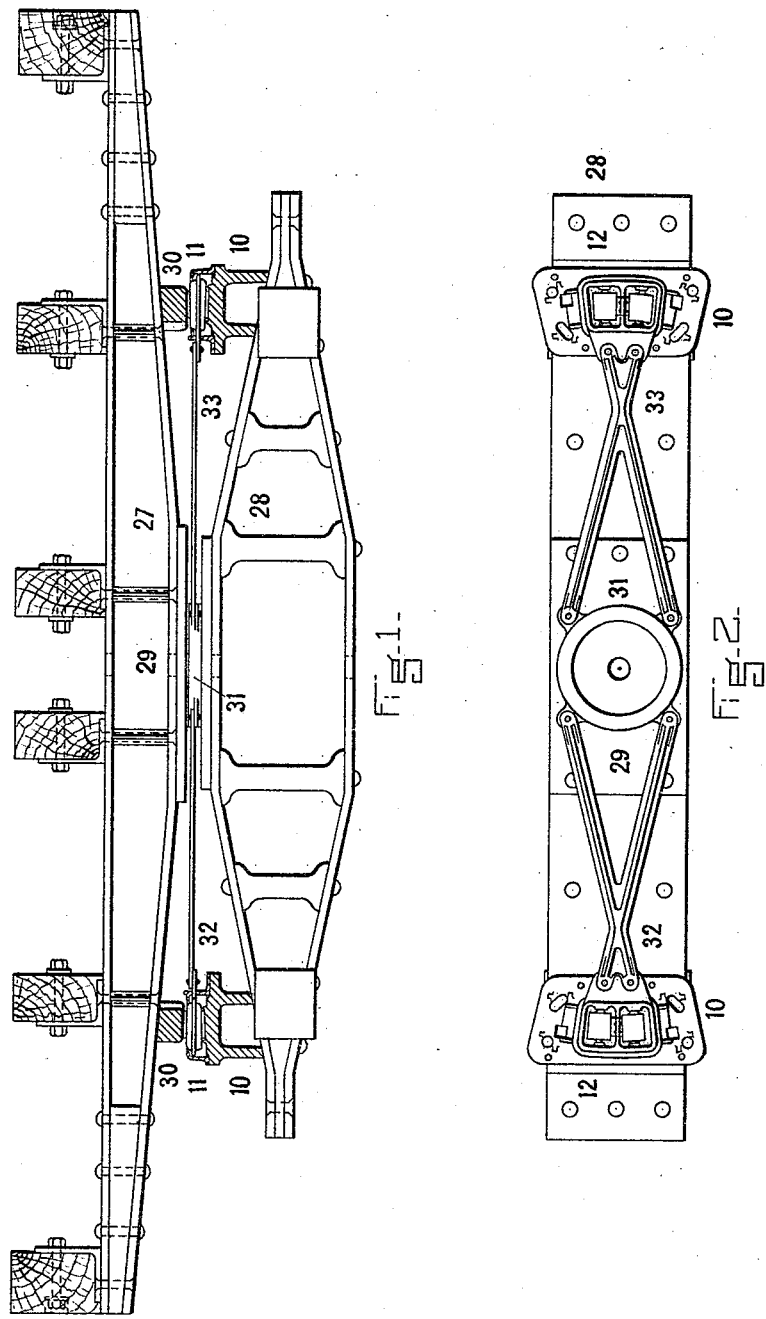
WITNESSES:
Charles B. Bliss
George L. Dolbeare
INVENTOR
Luther K. Jewett.
BY
E. Frank Woodbury
ATTORNEY.
THE NATIONAL LITHOGRAPHING COMPANY,
WASHINGTON, D. C.

(No Model.) 2 Sheets—Sheet 2.
L. K. JEWETT.
ANTIFRICTION SIDE BEARING FOR CARS.
No. 511,955. Patented Jan. 2, 1894.
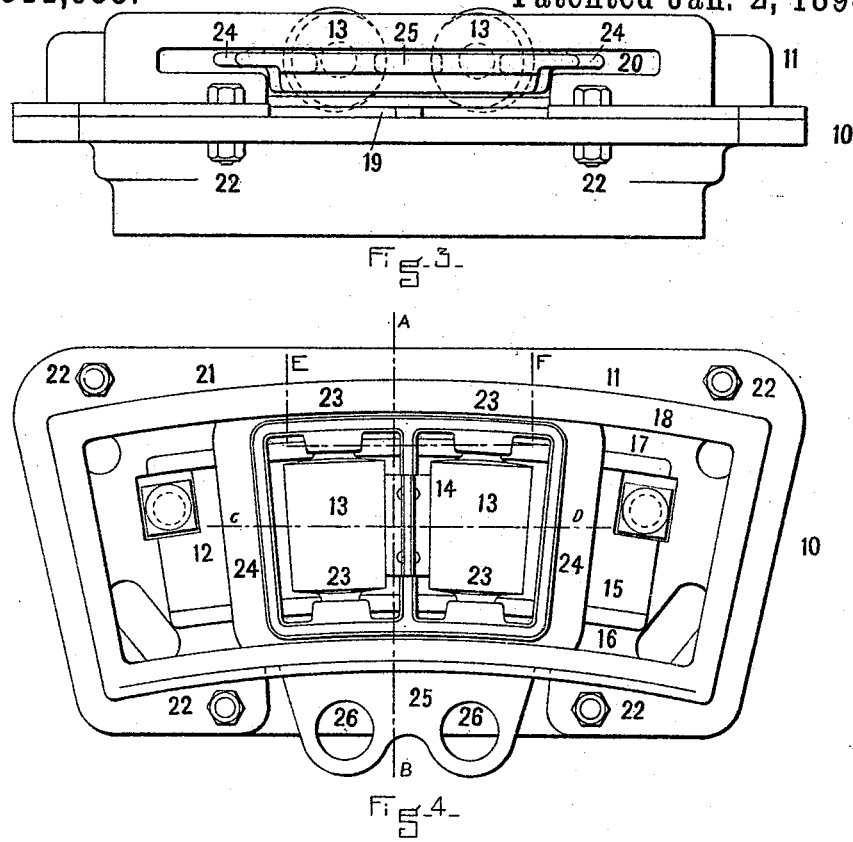
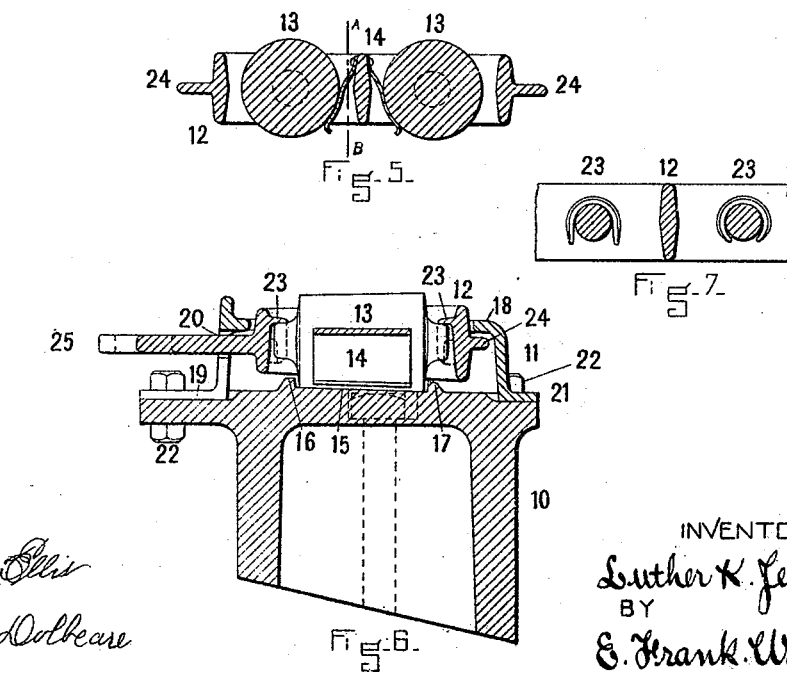
WITNESSES:
Charles L. Ellis
George L. Dolbeare
INVENTOR.
Luther K. Jewett
BY
E. Frank Woodbury
ATTORNEY.

UNITED STATES PATENT OFFICE.

LUTHER K. JEWETT, OF BOSTON, MASSACHUSETTS.

ANTIFRICTION SIDE BEARING FOR CARS.

SPECIFICATION forming part of Letters Patent No. 511,955, dated January 2, 1894.

Application filed September 4, 1893. Serial No. 484,766. (No model.)

*To all whom it may concern:*

Be it known that I, LUTHER K. JEWETT, a citizen of the United States, residing at Boston, in the county of Suffolk and State of Massachusetts, have invented a new and useful Antifriction Side Bearing for Cars, of which the following is a specification.

My invention relates to anti-friction side bearings, or a side bearing of the anti-friction class, for cars and it is designed especially for use upon freight cars.

It has for its object an efficient side bearing of low cost.

Figure 1 is a view illustrating the application of my invention to the bolsters of a car. The car body bolster, truck bolster, center plates, center plate ring, roll cage, and connecting arm are represented in elevation, and the car sills, top side bearing plate, bottom side bearing plate, and the roll cage housing are shown in section. Fig. 2 is a plan of the roll cage and rolls, center plate ring, connecting arm, bottom center plate, and truck bolster, shown in Fig. 1. Fig. 3 represents, upon an enlarged scale, in front elevation, the bottom side bearing plate, roll cage housing, roll cage, and rolls. Fig. 4 is a plan of Fig. 3. Fig. 5 is a sectional view of the rolls, roll cage, and the brake springs or brake on line A B of Fig. 4, and Fig. 6 is a sectional view of Fig. 4 on line C D showing in section, the bottom side bearing plate, roll cage, and roll cage housing, one of the rolls being shown in elevation. Fig. 7 is a sectional view of the rolls and roll cage on line E F of Fig. 4 showing the roll journal housings, designed to receive and hold the journals of the rolls in their correct position.

The bottom side bearing plate 10, roll cage housing 11, roll cage 12, rolls 13, and brake spring 14, are constructed as follows, referring especially to Figs. 3, 4, 5, 6, and 7.

The bottom side bearing plate 10 is provided, on its upper surface, with the circular track 15 upon which and between the circular ledges 16 and 17 the rolls 13 are designed to track or roll.

The roll cage housing 11 is provided with the inwardly projecting flange 18, designed to keep the roll cage in its correct position, the cut 19 and the slot 20 designed to receive the roll cage ear, and the outwardly projecting flange 21 by means of which and the bolts 22, the housing is fastened to the bottom side bearing plate.

The roll cage 12 is provided with the roll journal housings 23 adapted to receive the journals of the rolls 13, the outwardly projecting rib or shelf 24, designed to extend under the flange 18 of the roll cage housing, the ear 25 provided with holes 26 adapted to engage the connecting arm, and the brake spring 14 which may be made either in one piece, or in two pieces as shown. This brake spring 14 is designed to hold, by exerting a slight pressure against the rolls, the rolls in their correct position.

The rolls 13 are provided with journals which are designed to fit into the roll journal housings 23 within which the journals are free to turn. Each roll is shaped like a frustum, the imaginary apex of which would be the center of the center plates, or of the ring or track a part of which is represented by the path or track of the rolls.

The parts composing the complete bottom side bearing are assembled as follows: The brake spring is placed in its position upon the center rib of the roll cage, the rolls are mounted in the roll cage journal housings, all as shown, then the roll cage with its two rolls and brake spring may be handled as one piece and placed upon the circular track of the bottom side bearing plate. After doing this, the roll cage housing should be bolted to the bottom plate as shown.

Figs. 1 and 2 illustrate the application of my invention to the bolsters of a freight car. The car body bolster 27 represented is substantially the same as shown and described in my application for Letters Patent for car body bolsters, filed April 3, 1893, Serial No. 468,894, and the truck bolster 28 represented is of the open truss construction and is commonly known as the Jewett's truck bolster. These bolsters are provided with the ordinary center plates 29, and the car body bolster is provided with the top side bearing plate 30 which is a plain plate having a circular surface or track to correspond with and to be opposite to the circular track of the bottom side bearing. This top side bearing plate is fastened to the car body bolster by means of rivets or bolts, not shown. The center plate ring 31 is designed to fit loosely around the center hub of the center plates, and by means of the ring and the connecting arms 32 and 33, the two opposite roll cages are connected together.

Freight car construction as now conducted, requires that all the component parts of the car shall be of low cost, and this at present, necessitates the non use of anti-friction center plates such as are in use upon many passenger cars, simply on account of cost. For this reason, mainly, I have invented and perfected, as applied to the better class of freight cars, my brake side bearing and have connected, as shown by Figs. 1 and 2, the two opposite side bearing roll cages, by means of the connecting arms and center plate ring. This construction and arrangement prevents the rolling out of position, in use, of one roll cage, when one set of the rolls are not in touch with its top side bearing plate while at the same time the rolls of the other set of rolls of opposite roll cage are in contact with both the top and bottom side bearing plates. Usually, when the bolsters separate at one end, at the other end the bolsters tend to come or press together. Therefore it commonly happens, that when one set of rolls with their roll cage is free to move without being in rolling contact with both of its side bearing plates, the other set of rolls with their roll cage, will be in rolling contact with both of its side bearing plates, thereby insuring, under most circumstances, the correct relative locative positions of the connected roll cages.

For the poorer or cheaper class of freight cars I apply my device without using either the center plate ring or the connecting arms, in which case I also dispense with the roll cage ears, and the slots and cuts in the roll cage housing which are not necessary when the connecting arms are not used. I do this, mainly on account of the lessened first cost of the apparatus. In practical use my brake side bearings so constructed and arranged have successfully performed the duties required of them. The use of the brake spring, as applied to the rolls prevents their easy rolling out of position when the top side bearing plate is out of contact with the rolls. By actual test, the bottom side bearing plate may be inclined about twenty degrees without the rolls in their roll cage rolling or sliding; but if a pressure of about thirty pounds is applied to a set of rolls in their roll cage by means of a weighted top side bearing plate, the rolls will freely roll. This thirty pounds is an insignificant matter or amount when it is considered, that when in use, a set of rolls is subjected to a load of several tons. It is therefore evident, that the brake spring does not appreciably lessen the efficiency of the rolls. At the same time it is essential that a set of rolls should not be easily displaced when relieved of its load. It will be seen, that in case of an accident to the car, the roll cage could not be dislodged from its bottom side bearing plate, unless the roll cage housing was broken, as, by its construction, the inwardly projecting flange projects over the outwardly projecting flange or rib of the roll cage, thereby keeping the roll cage and rolls upon the circular track. If however the roll cage should be in such a position upon the circular track as would prevent the free rolling of the rolls by reason of the roll cage coming in contact, by accident, with one of the ends of the roll cage housing, then at the next movement of the top side bearing plate, toward the end of the roll housing plate against which the roll cage is in contact, the rolls being held against strains in that direction, would permit the sliding of the top side bearing plate over the upper surface of the rolls, and at the next movement of the top side bearing plate the rolls and roll cage would resume their correct position or nearly so.

When the center plate ring and the connecting arms are used it is not necessarily essential that the rolls should be provided with the brake spring.

For use upon some classes of cars, the trucks of which are not provided with the ordinary kinds of center plates, such as the cable cars and cars provided with (so called) radial trucks, the number of roll cages to the truck is usually increased to four or more in number, in which case, the number of roll cages and sets of rolls may be increased and each roll cage should be provided with a connecting arm to connect it to the center ring.

What I claim as new, and desire to secure by Letters Patent, is—

1. An anti-friction side bearing provided with the roll cage, the rolls of which are held under a slight pressure by means of the brake device, for the purposes specified, substantially as described.

2. An anti-friction side bearing composed of the top and bottom plates between which is placed the roll cage having the rolls which are held in a semi-non-rotative state by means of the brake spring, substantially as described.

3. An anti-friction side bearing, comprising the top and bottom plates, the roll cage housing having the inwardly projecting flange, the roll cage provided with the rolls and having the outwardly projecting flange, and the brake spring, substantially as and for the purposes set forth.

4. Two anti-friction side bearings, each being provided with the roll cage having the rolls, which are held under a slight pressure by means of the brake spring, and provided with the roll cage ears, in combination with the center plate ring and the connecting arms, substantially as described.

5. Anti-friction side bearings, two in number, each being composed of the top and bottom plates between which is placed the roll cage having the rolls which are held in a semi-non-rotative state by means of the brake spring, said cage being provided with the ear, in combination with the connecting arms and center plate ring substantially as and for the purposes set forth.

6. Anti-friction side bearings, two in number, each comprising the top and bottom plates, the roll cage housing having the inwardly projecting flange, the cut and slot, the roll cage provided with the rolls and having the outwardly projecting flange and the ear, and the brake spring, in combination with the connecting arms and center plate, substantially as set forth.

7. Anti-friction side bearings, the roll cages of which are connected together by means of the center plate ring and the connecting arms, the rolls of each roll cage being provided with the brake device, substantially as described.

In testimony whereof I have signed my name to this specification in the presence of two subscribing witnesses.

LUTHER K. JEWETT.

Witnesses:
E. FRANK WOODBURY,
CHARLES L. ELLIS.